MAGNETIC MEMORY SYSTEM EMPLOYING LOW AMPLITUDE AND SHORT DURATION DRIVE SIGNALS

Filed Dec. 26, 1963 4 Sheets-Sheet 1

INVENTOR
RAYMOND H. JAMES
BY Thomas J. Nikolai
ATTORNEY

Dec. 19, 1967 R. H. JAMES 3,359,546

MAGNETIC MEMORY SYSTEM EMPLOYING LOW AMPLITUDE AND SHORT DURATION DRIVE SIGNALS

Filed Dec. 26, 1963 4 Sheets-Sheet 4

3,359,546
Patented Dec. 19, 1967

3,359,546

MAGNETIC MEMORY SYSTEM EMPLOYING LOW AMPLITUDE AND SHORT DURATION DRIVE SIGNALS

Raymond H. James, Bloomington, Minn., assignor to Sperry Rand Corporation, New York, N.Y., a corporation of Delaware Filed Dec. 26, 1963, Ser. No. 333,331
9 Claims. (Cl. 340—174)

ABSTRACT OF THE DISCLOSURE

A magnetizable memory device operated at approximately one-fourth the conventional irreversible switching threshold $NI_0$. The irreversible switching threshold $NI_0/4$ provides partially-switched memory state flux levels with half-select coincident current selection and with distinguishable memory state output signals.

The value of the utilization of small cores of magnetizable material as logical memory elements in electronic data processing systems is well known. This value is based upon the bistable characteristic of magnetizable cores which includes the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein the term "nondestructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein, however, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristic is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1," to the other magnetic state corresponding to the opposite direction of saturation, i.e., negative saturation denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials.

One technique of achieving destructive readout of a toroidal bistable memory core is that of the well-known coincident current technique. This method utilizes the threshold characteristic of a core having a substantially rectangular hysteresis characteristic. In this technique, a minimum of two interrogate lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient amplitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings that thread the central aperture with a transverse interrogate field, i.e., an externally applied field directed across the core's internal flux applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap that is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor" Rajchman and Lo, Proceedings of the IRE, March 1956, pp. 321–332. This method utilizes a "Transfluxor" that comprises a core of magnetizable material of a substantially rectangular hysteresis characteristic having at least a first large aperture and a second small aperture therethrough. These apertures form three flux paths; the first defined by the periphery of the first aperture, a second defined by the periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving a nondestructive readout of a magnetic memory core is that disclosed in the article "Fluxlock-High Speed Core Memory" Instruments and Control Systems, Robert M. Tillman, May 1961, pp. 866–869. This method utilizes a bistable magnetic toroidal memory core having write and sense windings threading the core's central aperture and an interrogate winding wound about the core along a diameter of the core. Information is stored in the core in the conventional manner. Interrogation is achieved by coupling an interrogate current signal to the interrogate winding causing a temporary alteration of the core's magnetic state. Readout of the stored information is achieved by a bipolar output signal induced in the sense winding the polarity phase of the readout signal indicating the information stored therein.

One method of achieving a decreased magnetic core switching time is to employ time-limited switching techniques as compared to amplitude-limited switching techniques. In employing the amplitude-limited switching technique, the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on readout of the stored data. Also, where the final core flux density level is limited solely by the amplitude of the applied drive field it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its amplitude-limited unsaturated conditions. A second drive field having a predetermined amplitude and a polarity opposite to that of the first drive field is applied to the core for a duration insufficient to allow the core flux density to reach an amplitude-limited condition. This second drive field places the core in a time-limited stable-state, the flux density of which is considerably less than the flux density of the second stable-state normally used for conventional, or amplitude-limited operation. The second stable-state may be fixed in position by the asymmetry of the two drive field durations and by the procedure of preceding each second drive field application with a first drive field application. Additionally, the second stable-state may be fixed in position by utilizing a saturating first drive field to set the first stable-state as a saturated state. The article "Flux Distribution in Ferrite Cores Under Various Modes of Partial Switching," R. H. James, W. M. Overn and C. W. Lundberg, Journal of Applied Physics, Supplement, vol. 32, No. 3, pp. 38S–39S, March 1961, provides excellent background material for this switching technique.

The magnetic conditions and their definitions as discussed above may now be itemized as follows:

*Partial switching*

*Amplitude-limited.*—Condition wherein with a constant drive field amplitude, increase of the drive field duration will cause no appreciable increase in core flux density.

*Time-limited.*—Condition wherein with a constant drive field amplitude, increase of the drive field duration will cause appreciable increase in core flux density.

*Complete switching*

*Saturated.*—Condition wherein increase of the drive field amplitude and duration will cause no appreciable increase in core flux density.

*Stable-state.*—Condition of the magnetic state of the core when the core is not subjected to a variable magnetic field or to a variable current flowing therethrough.

The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense.

The present invention is concerned with the amplitude of the drive signal that is necessary to provide irreversible switching of a magnetizable memory element's stable-state flux. As previously discussed regarding operation of a toroidal ferrite core as a memory element, the switching threshold of the core's dynamic hysteresis loop establishes the amplitude-duration characteristic of the drive field to be utilized. Keeping the amplitude of the coincident current half-select drive field less than but almost equal to $NI_0$ provides workable memories but requires large drive currents for the saturating fields H. However, there is then introduced the problem of half-select noise. Half-select noise is a noise signal induced in the coupled sense line due to previous half-select drive fields causing the magnetic state of the coupled core to undergo some irreversible flux switching and to cause the flux level to be placed in a stable-state different from its normal saturated stable-state. Such different stable-states representing a different flux level than the normal stable-state do upon the subsequent read cycle provide an erroneous output signal designated "half-select noise." Although each previously half-selected core when subjected to a readout field may couple a relatively small signal to the coupled sense line the cumulative effect of a plurality of such cores in a memory array is to provide signals of amplitudes approximating that of a full-select read "1" signal. Several systems such as drive line coupling and sense line coupling cancellation and post-write disturb pulses have been tried to eliminate this problem encountered in coincident current memories. The terms "signal," "pulse," etc., when used herein shall be used interchangeably to refer to the current signal that produces the corresponding magnetic field and to the magnetic field produced by the corresponding current signal.

The present invention eliminates such a problem. Applicant has discovered that most magnetizable memory elements, such as toroidal ferrite cores and transfluxors, have an irreversible flux switching threshold that is at approximately one-fourth the conventional switching threshold. Using this discovery applicant is able to utilize amplitude-limited drive fields whose amplitudes are substantially below the conventional drive field amplitudes and yet provide memory elements capable of half-select coincident current selection with readout signals distinguishable between a "1" and a "0." Additionally, such short duration-low amplitude drive fields provide a method of operating conventional ferrite cores at a greatly decreased switching time, e.g., in the order of 100 ns. (nanoseconds).

Accordingly, it is a primary object of the present invention to provide a novel method of operating a memory element.

It is another object of the present invention to provide a memory system utilizing drive signal amplitudes and durations substantially below those used in the previous operation of similar devices.

It is another object of the present invention to provide a memory system utilizing half-select drive fields that cause the memory element's magnetic state to move through a reversible flux change while coincidence of two such half-select drive fields causes the memory element's magnetic state to move through an irreversible flux change.

It is a further object of the present invention to provide a three dimensional memory system capable of bit selection by the coincidence of half-select currents, each half-select current being individually incapable of inducing any substantial irreversible flux switching in the half-selected cores.

These and other more detailed and specific objects will be disclosed in the course of the following specification, reference being had to the accompanying drawings, in which.

Figure 1:
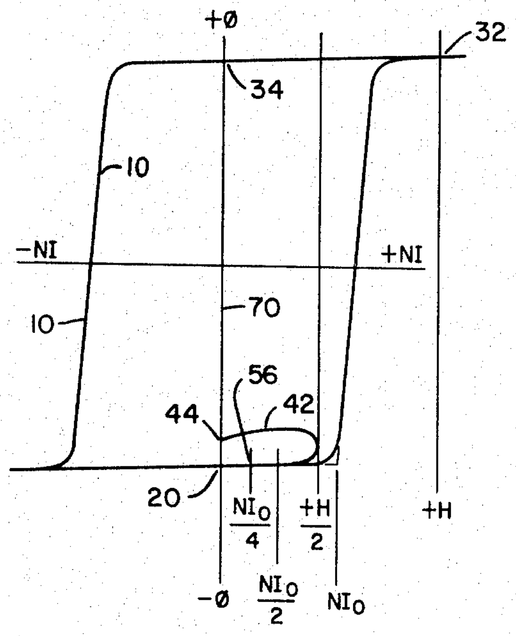
FIG. 1 is an illustration of a typical residual magnetization curve of the memory devices of the present invention.
Figure 2:
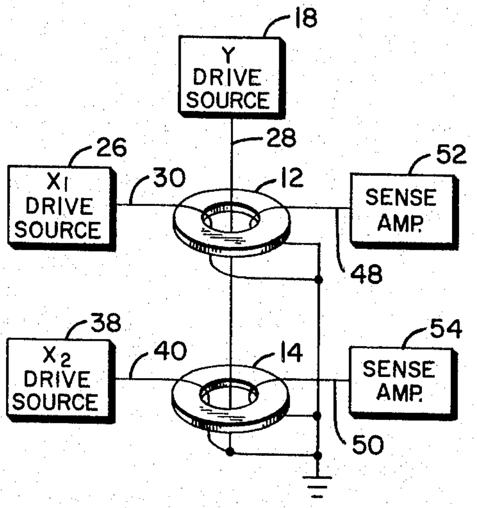
FIG. 2 is an illustration of a two-bit-long-word memory array utilizing concident-current write and word-organized read drive fields.
Figure 3:
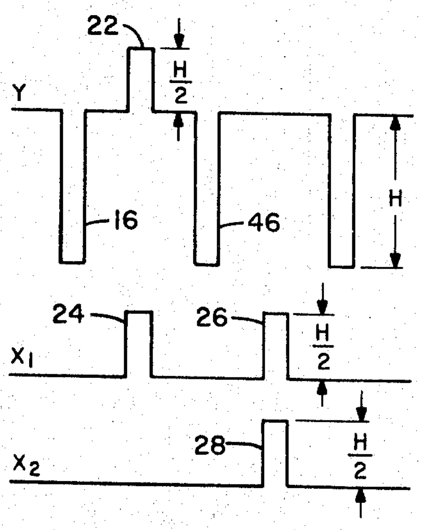
FIG. 3 is an illustration of the prior art drive field relationships of the memory array of FIG. 2 as explained with FIG. 1.

With particular reference to FIG. 1 there is illustrated a typical residual magnetization curve of the magnetizable memory elements of FIG. 2 that may be operated in accordance with the present invention. Major loop 10 is a plot of the flux $\phi$ versus the applied magnetomotive force NI of saturating field intensity. Prior art operation (see FIG. 3) of a half-select coincident current memory element such as cores 12 and 14 of FIG. 2 often utilized an initial write "0" or clear pulse 16 from, for example, Y drive source 18 which placed cores 12 and 14 in an initial negative substantially-saturated magnetic stable-state as at point 20 of curve 10. Next, if a "1" were to be written into core 12 coincident current pulses 22 and 24 from sources 18 and 26, respectively, would be coupled to their respective drive lines 28 and 30. The coincident fields due to pulse 22 and 24 both being of $+H/2$ (less than $NI_0$—see FIG. 1) would move the magnetic state of core 12 along the curve 10 to a point of positive saturation denoted by point 32. Upon cessation of pulses 22 and 24 the magnetic state of core 12 would fall back along the upper substantially horizontal portion of loop 10 to point 34 which would be the point of positive saturated remanent magnetization. However, core 14 being effected only by the magnetizing field of $+H/2$ caused by pulse 22—drive source 38 not concurrently coupling a pulse to its associated drive line 40—would traverse a minor loop 42 and settle back at point 44 which would be a "disturbed" stable-state of a different flux density than its initial "0" negative substantially-saturated magnetic stable-state represented by point 20. See M. K. Haynes Patent No. 2,881,-414 for a more detailed discussion of such operation. The next subsequent read operation, for example in word-organized readout, would be initiated by source 18 coupling pulse 46 to the word drive line 28—if cores 12 and 14 may be considered to form a word of a two-bit length. This would cause the magnetic states of cores 12 and 14 to move from their previous stable-states of points 34 and 44, respectively, to the initial "0" negative substantially-saturated magnetic stable-state of point 20. Signals representative of the flux change—for core 12 from point 34 to point 20 and for core 14 from point 44 to point 20—would be induced in their respective readout or output lines 48 and 50 causing a representative signal amplitude to be detected by sense amplifiers 52 and 54, respectively. In this arrangement, when cores 12 and 14 each have their own associated output line and sense amplifier the cumulative effect of a plurality of half-select disturbances would be of no consequence. However, in a practical two-dimensional memory array there is usually only one output line per plane or at most one output line per bit per word with a plurality of words per plane. That is, in a practical two-dimensional array more than one half-selected core is coupled to each output line. In such a situation the cumulative effect of a plurality of half-select disturbances could induce an erroneous read "1" output signal in the associated sense amplifier.

In the previously described operation points 34 and 44 achieved by cores 12 and 14, respectively, represented irreversible flux changes. That is, in moving from their initial "0" state at point 20 the flux change caused by the associated drive field was a flux change that would not reverse itself and return to its original state upon removal of the drive field. Thus, in both informational states—the "1" positive saturated magnetic stable-state of point 34 and the "0" partially-switched stable-state of point 44—there was effected an irreversible flux change.

Applicant has discovered that if the half-select drive fields are limited to approximately $NI_0/4$ where $NI_0$ is defined as the switching threshold (see FIG. 1), such half-select drive fields will effect substantially no irreversible flux switching. Consequently, upon the coupling of half-select drive field 22a of $NI_0/4$ from source 18 to drive line 28, cores 12 and 14 will undergo no substantial irreversible flux change such that upon separate application of such individual fields the magnetic states of cores 12 and 14 will move from their initial "0" stable-state of point 20 out to point 56 and upon cessation of such field the magnetic states of cores 12 and 14 will return to their initial "0" stable-state of point 20. However, if source 18 and 26 concurrently couple drive current pulses producing fields 22a and 24a each of $NI_0/4$ to their respective drive lines 28 and 30, core 12 will be effected by a drive field of $NI_0/2$ and core 14 will be effected by a drive field of $NI_0/4$. As a drive field of $NI_0/2$ causes the magnetic state of core 12 to move into an area of irreversible flux change (see FIG. 5) core 12 would, upon cessation of the drive field of $NI_0/2$ fall back into the stable-state represented by point 58. As a drive field of $NI_0/4$ causes the magnetic state of core 14 to move within the area of reversible flux change, core 14 would upon cessation of the drive field 22a of $NI_0/4$ fall back into its initial "0" stable-state of point 20. Thus, it can be seen that the prior art problem of half-select irreversible flux change has been eliminated by applicant's use of a half-select drive field of $NI_0/4$.

Figure 5:
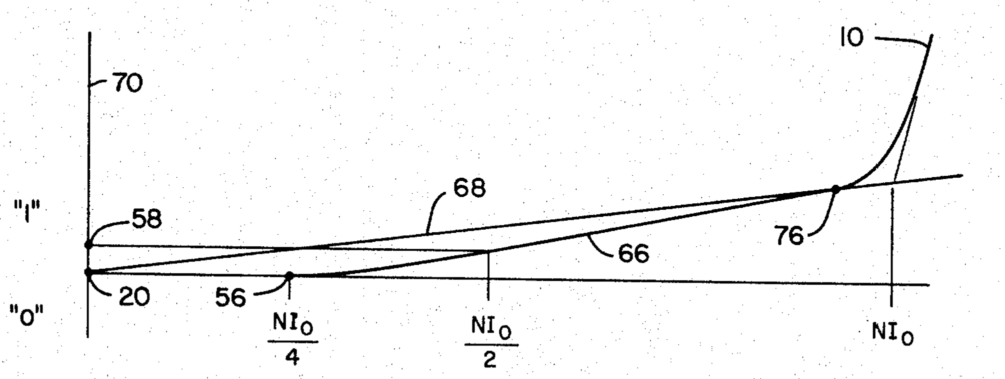
FIG. 5 is an enlarged portion of the curve of FIG. 1 showing plots of the reversible and the irreversible flux switching characteristic thereof.
Figure 6:
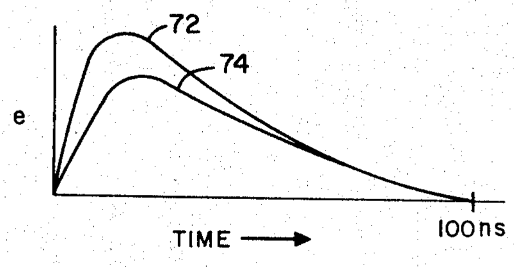
FIG. 6 is an illustration of the plots of the output voltages due to the total flux change (both reversible and irreversible) and due to the reversible flux change in the memory devices of the present invention.
Figure 7:
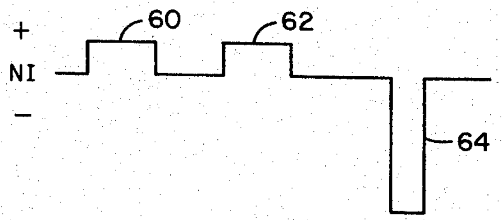
FIG. 7 is an illustration of the drive fields utilized to gain the data of FIGS. 5 and 6.

Determination of the irreversible flux switching threshold of $NI_o/4$ was achieved by the use of the control signals of FIG. 7 producing the outputs of FIG. 6 and plotted in FIG. 5. In FIG. 7 drive fields 60 and 62 are amplitude-limited drive fields and drive field 64 is a saturating drive field. Using a General Ceramics S–4, 80–50 ferrite core as cores 12 and 14 of FIG. 2 assume for the following discussion that Y drive source 18 (see FIG. 2) couples drive fields 60, 62 and 64 thereto by way of drive line 28, causing the output signals of FIG. 6 to be induced in output line 48 and thence coupled to sense amplifier 52. The amplitude of pulses 60 and 62—both pulses being identical pulses—are varied from a field intensity of $NI=0$ to $NI=NI_o$ to produce the data of FIG. 5.

As stated previously curve 10 of FIG. 1 is a residual magnetization curve—i.e., a plot of the irreversible flux change $\phi$ versus the applied drive field intensity NI. FIG. 5, which is a diagrammatic illustration of the lower right-hand portion of curve 10, illustrates both the irreversible flux change of curve 66 and the reversible flux change of curve 68 as obtained with the drive fields of FIG. 7. In obtaining the data of FIG. 5, fields 60 and 62 were started at an amplitude of zero and increased in incremental steps at each test to $NI=NI_o$. Field 60 was utilized to move the magnetic state of core 12 in a +NI direction inducing a reversible flux change at $$0<NI<\frac{NI_o}{4}$$

and both a reversible and an irreversible flux change at $$\frac{NI_o}{4}<NI$$

inducing a corresponding output signal 72—see FIG. 6—in output line 48. Upon the cessation of field 60 the magnetic state of core 12 would fall back into a stable-state along line 70 where $NI=0$. Any induced irreversible flux change would cause the magnetic state of core 12 to come to rest at a stable-state different than the negative substantially-saturated remanent magnetic stable-state of point 20. Upon the application of field 62 the magnetic state of core 12 would be effected by only the reversible flux change identical to that caused by the preceding field 60. The output signal 74—see FIG. 5—induced in output line 48 would then be a signal representative of only the reversible flux change due to that particular drive field 60 and 62 intensity and was plotted in FIG. 5 as curve 68. Upon the application and cessation of the negative saturating drive field 64 to core 12 its magnetic state would be returned to its initial point 20. The difference between the area enclosed by curves 72 and 74 indicative of the irreversible flux change due to that particular drive field 60 intensity was plotted in FIG. 5 as curve 66. Continuous determination of the reversible and irreversible flux changes at increasing amplitudes of fields 60 and 62 of $$0<NI<\frac{NI_o}{4}$$

were conducted with no evidence of any irreversible flux change as noted in FIG. 5. At a drive field intensity of approximately $$NI=\frac{NI_o}{4}$$

a slight irreversible flux change was detected—the previous single curve of FIG. 6 separated into two distinct curves 72 and 74. The output signals induced in line 48 were plotted as in FIG. 6 as a plot of output voltage $e$ versus time $t$. Utilizing the relationship $\phi=\int edt$ the area under curve 72, representative of the reversible plus irreversible flux change due to the application of field 60, and the area under curve 74, representative of the reversible flux change due to the application of field 62, were measured by a planimeter. Curve 68 was plotted from the output signal due to field 62 as indicated by the area under curve 74 of FIG. 6 and curve 66 was plotted from the output signal due to field 60 as indicated by the area under curve 72 of FIG. 6 less the output signal due to field 62 as indicated by the area under curve 74 of FIG. 6.

The amplitude, i.e., intensity, of fields 60 and 62 were then increased in the range $$\frac{NI_o}{4}<NI<NI_o$$

with the convergence of curves 66 and 68 occuring at a field intensity something less than $NI_o$, such as at point 76, at which time with increasing drive field intensity the relative amount of irreversible flux change increased sharply. It is to be noted here that curve 66 is the lower portion of curve 10, i.e., is a portion of curve 10, as illustrated in FIG. 1.

Figure 8:
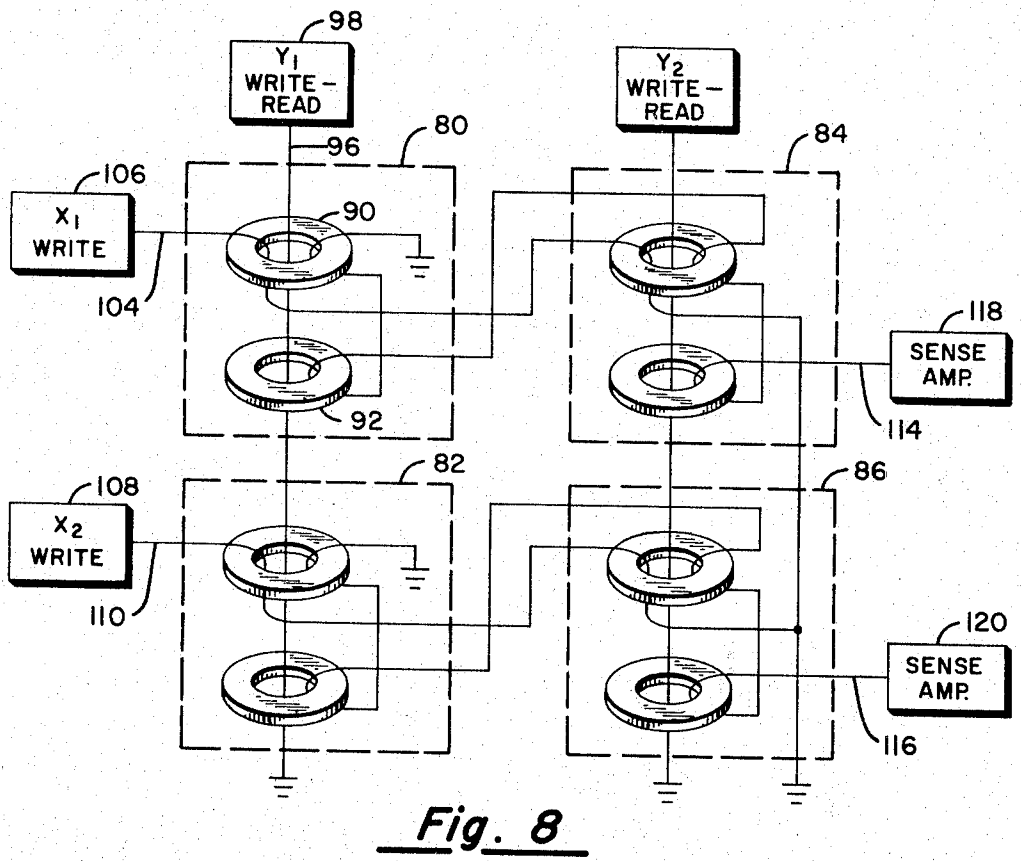
FIG. 8 is an illustration of a first embodiment of the present invention using toroidal ferrite cores as the magnetizable memory devices.
Figure 9:
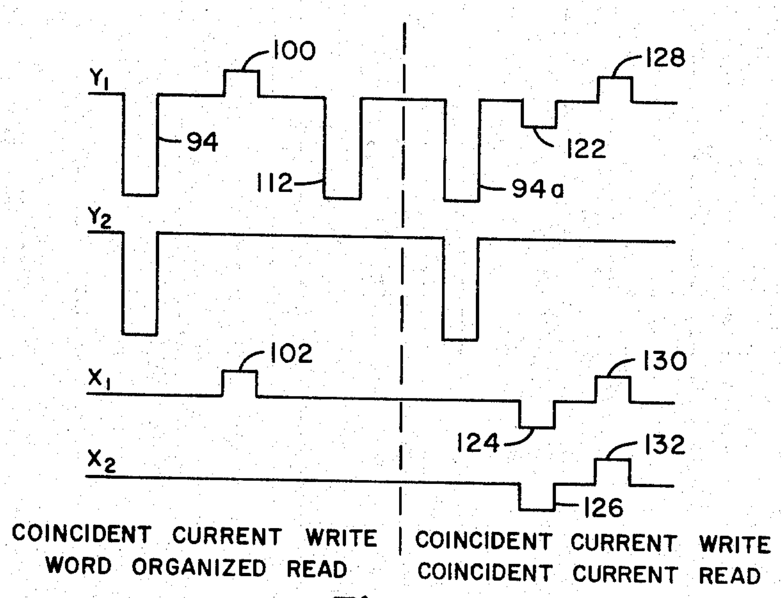
FIG. 9 is an illustration of the control signals associated with the embodiment of FIG. 8.

With particular reference to FIGS. 8 and 9 there is disclosed a first preferred embodiment of the present invention. In this illustrated embodiment of one plane of a multi-planar array of four memory devices each memory device is comprised of two cores forming a two-core-per-bit memory system. The four memory devices 80, 82, 84 and 86 are arranged in a two word array; each word of a two bit-length with words arranged vertically in columns $Y_1$ and $Y_2$ and bits arranged in rows $X_1$ and $X_2$. Writing is accomplished by concurrent energization of an X and a Y line and reading is accomplished by the energization of a Y line inducing in the X row aligned output lines the signals indicative of the informational state of the memory device at the energized XY intersection.

Figure 4:
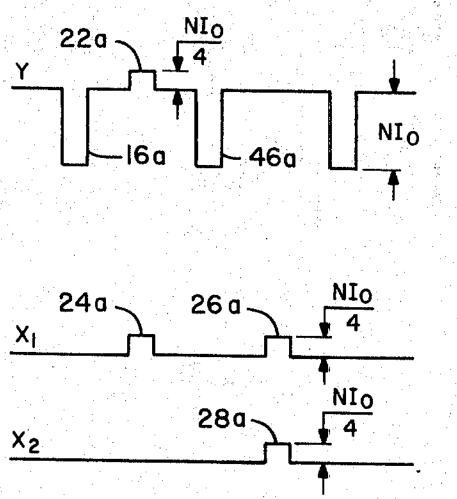
FIG. 4 is an illustration of the drive field relationships of the memory array of FIG. 2 embodying the present invention.

The use of a two-core-per-bit arrangement is not essential to the operation of applicant's invention. However, due to the low level operation of the memory devices such arrangement is preferred as it provides a greatly enhanced signal-to-noise ratio. In this arrangement the X or bit line is coupled only to the information core with the Y, or word line, being coupled to both the information core and the buck-out core. With the output line wound about the information core and the buck-out core in an opposite magnetic sense the signal induced in the coupled readout line is the difference signal, i.e., the signal due to the difference between the informational states of the two cores. As an example, if core 90 of memory device 80 is coupled by coincident drive fields such as *22a* and *24a*, respectively, of FIG. 4, it would be placed in an informational state such as point 58 of FIG. 5. This may be considered as the coincident-current writing of a "1" in memory device 80. As core 92 is coupled by only the word line drive field *22a*, it returns to its initial magnetic state of point 20. Now, during the next read cycle drive field *46a* is coupled to both cores 90 and 92 driving their magnetic states into negative saturation to come to rest at their initial magnetic state of point 20. As core 90 is the only core of cores 90 and 92 that undergoes any substantial flux change during readout—from $\phi_1$, at point 58 to $\phi_o$ at point 20—the disturbances due to the coupling of the read line to cores 90 and 92 are the same but of opposite magnetic sense so as to cancel each other leaving only the substantial signal induced in the output line due to the flux change in core 90.

Operation of the memory array of FIG. 8 is best explained with the typical control signals of FIG. 9. Assume that it is desired to write the binary word "10" into the word along $Y_1$ word line formed by memory devices 80 and 82. Initially, devices 80 and 82 are set into an initial clear state such as the "0" negative substantially-saturated remanent magnetic stable-state of point 20 by the application of signal 94 to word line 96 by $Y_1$ write-read source 98. Next, signals 100 and 102 are concurrently applied, to $Y_1$ word line 96 and $X_1$ bit line 104, respectively, by write-read source 98 and $X_1$ write source 106, respectively—for the writing of a "0" in device 82, $X_2$ write source 108 couples no signal to X bit line 110. Thus, as explained above, the word defined by devices 80–82 of $Y_1$ word line 96 is a binary "10."

Readout of the information in the array of FIG. 8 is accomplished by the application of signal 112 to $Y_1$ word line 96 by $Y_1$ write-read source 98. The signals indicative of the informational states of devices 80 and 82 are induced in their respective row oriented output lines 114 and 116, respectively, producing corresponding signals in the associated sense amplifiers 118 and 120.

Alternatively, writing could be accomplished by concurrent energization of an X and a Y line—as before—but reading could be accomplished by the concurrent energization of an X and a Y line by read pulses of a similar amplitude-duration characteristic as the write pulses but of opposite polarity. Assume that it is desired to write the binary word "11" into the word along $Y_1$ word line 96 formed by memory devices 80 and 82. Initially, devices 80 and 82 are set into an initial clear state such as the "0" negative substantially-saturated remanent magnetic stable-state of point 20 by the application of signal 94*a* to $Y_1$ word line 96 by $Y_1$ write-read source 98. Next, signals producing fields 122, 124 and 126 are concurrently applied to $Y_1$ word line 96, $X_1$ bit line 104 and $X_2$ bit line 110, respectively, by $Y_1$ write-read source 98, $X_1$ write source 106 and $X_2$ write source 108, respectively. As desired, the word defined by the informational states of devices 80–82 of $Y_1$ word line 96 is a binary "11."

Readout of the information in the array of FIG. 8 is, in this method, accomplished by the concurrent application of signals 128, 130 and 132 to $Y_1$ word line 96, $X_1$ bit line 104 and $X_2$ bit line 110, respectively, by $Y_1$ write-read source 98, $X_1$ write source 106 and $X_2$ write source 108, respectively. Read fields 128, 130 and 132, being of a similar amplitude-duration characteristic as write fields 122, 124 and 126, respectively, but of opposite polarity, induce in their respective row oriented output lines 114 and 116 signals indicative of the informational states of devices 80 and 82 producing corresponding signals in the associated amplifiers 118 and 120, respectively.

Figure 10:
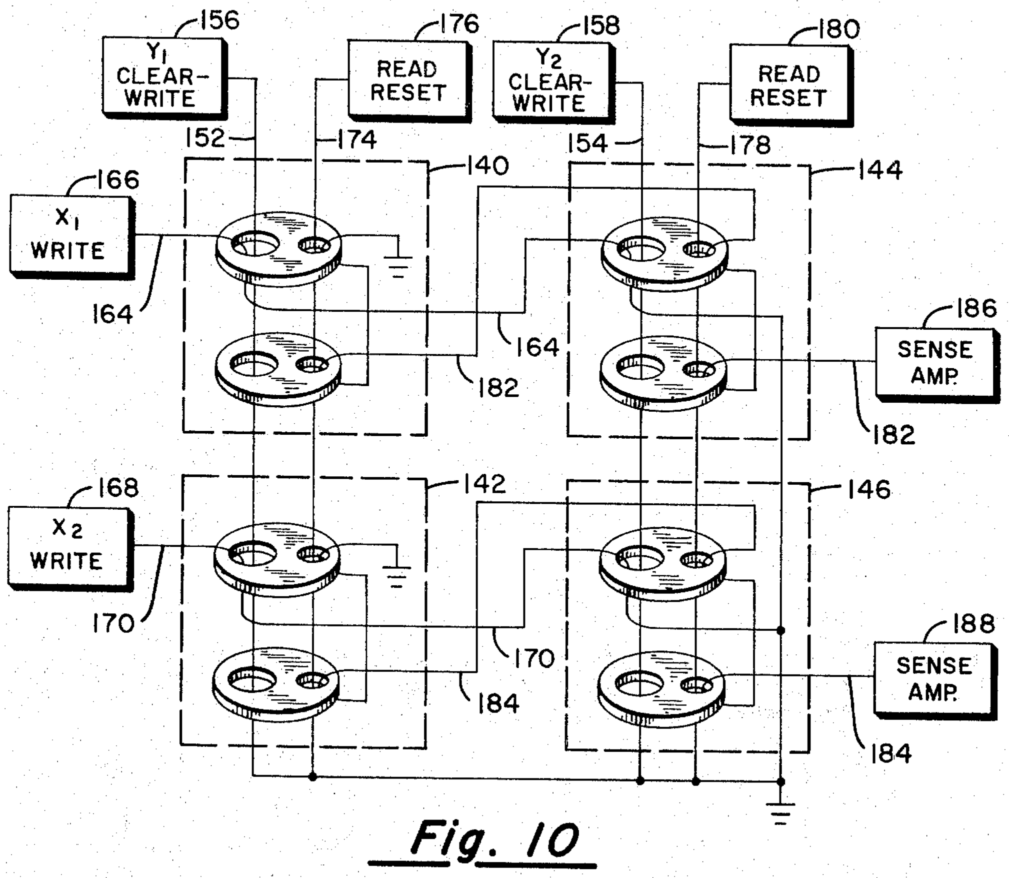
FIG. 10 is an illustration of a second embodiment of the present invention using transfluxors as the magnetizable memory devices.
Figure 11:
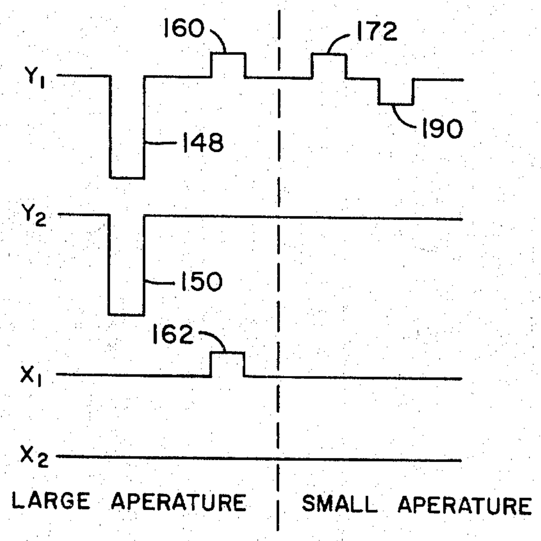
FIG. 11 is an illustration of the control signals associated with the embodiment of FIG. 10.

With particular reference to FIGS. 10 and 11 there is disclosed a second preferred embodiment of the present invention. In this illustrated embodiment of one plane of a multi-planar array of four memory devices per plane each memory device is comprised of two transfluxors forming a two-core-per-bit memory system. The four memory devices 140, 142, 144 and 146 are arranged in a two word array; each word of a two-bit-length with words arranged vertically in columns $Y_1$ and $Y_2$ and bits arranged in rows $X_1$ and $X_2$. Writing is accomplished by concurrent energization of an X and a Y write line and reading is accomplished by the energization of a Y read line inducing in X row aligned output lines the signals indicative of the informational state of the memory device at the energized XY intersection. The use of the two-core-per-bit arrangement is similar to that of FIG. 8.

Operation of the transfluxors of FIG. 10 is in the conventional manner—except for the use of the low level drive signals of the present invention—as discussed in the aforementioned Rajchman and Lo article. In this procedure an initial clear field is coupled to the large aperture setting the flux thereabout in an initial "0" substantially-saturated clockwise direction such as at point 20 of FIG. 5—the flux in the two legs on either side of the small aperture are in the same direction, clockwise with respect to the large aperture. For the write operation a field of opposite magnetic sense to that of the clear field is coupled to the large aperture switching, or reversing, some or all of the flux about the large aperture—and incidentally the flux in the information leg (that is the leg formed between the large and small apertures). This sets the flux in the information leg in a "1" remanent magnetic state such as at point 58 of FIG. 5. For the read operation a read field is coupled to the small aperture in a magnetic sense in the information leg that is opposite to the flux direction established by the write field that was coupled to the large aperture. This read field switches, or reverses, that flux in the information leg that was switched by the write field inducing in the X row aligned output lines the signals indicative of the informational states of the memory devices along the energized Y read lines. The unconditional reset field—of a similar amplitude-duration characteristic as the read field but of opposite polarity—is then coupled to the small aperture resetting the flux in the information leg in the state originally established by the write field.

Operation of the memory array of FIG. 10 is best explained with the typical control signals of FIG. 11. Assume that it is desired to write the binary word "10" into the word along the $Y_1$ word line formed by memory devices 140 and 142. Initially, devices 140, 142, 144 and 146 are set into an initial clear state such as the "0" negative substantially-saturated remanent magnetic stable-state of point 20 of FIG. 5 by the application of signals 148 and 150 to $Y_1$ clear-write line 152 and $Y_2$ clear-write line 154, respectively, by $Y_1$ clear-write source 156 and by $Y_2$ clear-write source 158, respectively. Next, signals 160 and 162 are concurrently coupled to $Y_1$ clear-write line 152 and $X_1$ bit line 164, respectively, by $Y_1$ clear-write source 156 and $X_1$ write source 166, respectively—for the writing of a "0" in element 142, $X_2$ write source 168 couples no signal to X bit line 170. Thus, as explained above, the word defined by devices 140 and 142 of $Y_1$ word line is a binary "10."

Readout of the information in the $Y_1$ word line of the array of FIG. 10 is accomplished by the application of a signal producing field 172 to $Y_1$ read-reset line 174 by $Y_1$ read-reset source 176—if the information in the $Y_2$ word line is desired a similar read signal producing field would be applied to $Y_2$ read-reset line 178 by $Y_2$ read-reset source 180. The signals indicative of the informational states of devices 140 and 142 are induced in their respective row oriented output lines 182 and 184, respectively, producing corresponding signals in the associated sense amplifiers 186 and 188. Lastly, the unconditional reset field 190 is coupled to the small apertures of the transfluxors of devices 140 and 142 by applying a reset field producing signal to $Y_1$ read-reset line 74 from $Y_1$ read-reset source 176. The flux state of the information leg is now reestablished into the flux state immediately following the write operation.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

I claim:

1. A magnetic memory device, comprising:

a magnetizable memory element having a substantially rectangular hysteresis characteristic and being capable of being operated in a time-limited, an amplitude-limited or a saturated condition as a function of a magnetic field of a predetermined amplitude-duration characteristic;

said element having a switching threshold $NI_o$;

said element having substantially no irreversible flux change when affected by an amplitude-limited drive field of approximately $NI_o/4$;

said element having a relatively substantial irreversible flux change when subjected to an amplitude-limited drive field of approximately $NI_o/2$;

first write drive means for coupling a positive polarity amplitude-limited first write drive field of approximately $NI_o/4$ to said element;

second write drive means for coupling a positive polarity amplitude-limited second write drive field of approximately $NI_o/4$ to said element;

read drive means for coupling a negative polarity saturating read drive field to said element;

readout means for providing a readout signal when said element undergoes a flux change when affected by said read drive field;
said read drive field causing a substantial readout signal to be induced in said readout means when said element has been previously affected by concurrent application of said first and second write drive fields;
said read drive field causing an insubstantial readout signal to be inducted in said readout means when said element has not been previously affected by concurrent application of said first and second write drive fields.

2. A magnetic memory device, comprising:
a magnetizable memory element having a substantially rectangular hysteresis characteristic and being capable of being operated in a time-limited, an amplitude-limited or a saturated condition as a function of a magnetic field of a predetermined amplitude-duration characteristic;
said element having a switching threshold $NI_0$;
said element having substantially no irreversible flux change when affected by an amplitude-limited drive field of approximately $NI_0/4$;
said element having a relatively substantial irreversible flux change when subjected to an amplitude limited drive field of approximately $NI_0/2$;
first write drive means for coupling a positive polarity amplitude-limited first write drive field of approximately $NI_0/4$ to said element;
second write drive means for coupling a positive polarity amplitude-limited second write drive field of approximately $NI_0/4$ to said element;
read drive means for coupling a negative polarity saturating read drive field to said element;
readout means for providing a readout signal when said element undergoes a flux change when affected by said read drive field;
said read drive field causing a relatively substantial readout signal to be induced in said readout means when said element has been previously affected by concurrent application of said first and second write drive fields;
said read drive field causing a relatively insubstantial readout signal to be induced in said readout means when said element has not been previously affected by concurrent application of said first and second write drive fields.

3. A magnetic memory device, comprising:
a magnetizable memory element having a substantially rectangular hysteresis characteristic and being capable of being operated in a time-limited, an amplitude-limited or a saturated condition as a function of a magnetic field of a predetermined amplitude-duration characteristic;
said element having a switching threshold $NI_0$;
said element having substantially no irreversible flux change when affected by an amplitude-limited drive field of approximately $NI_0/4$;
said element having a relatively substantial irreversible flux change when subjected to an amplitude-limited drive field of approximately $NI_0/2$;
first write drive means for coupling a positive polarity amplitude-limited first write drive field of approximately $NI_0/4$ to said element;
second write drive means for coupling a positive polarity amplitude-limited second write drive field of approximately $NI_0/4$ to said element;
read drive means for coupling a negative polarity amplitude-limited read drive field of at least $-NI_0$ to said element;
readout means for providing a readout signal when said element undergoes a flux change when affected by said read drive field;
said read drive field causing a substantial readout signal to be induced in said readout means when said element has been previously affected by concurrent application of said first and second write drive fields;
said read drive field causing a relatively insubstantial readout signal to be induced in said readout means when said element has been previously affected by application of only one of said first or second write drive field.

4. A magnetic memory device, comprising:
a magnetizable memory element having a substantially rectangular hysteresis characteristic and being capable of being operated in a time-limited, an amplitude-limited or a saturated condition as a function of a magnetic field of a predetermined amplitude-duration characteristic;
said element having a switching threshold $NI_0$;
said element undergoing relatively substantially no irreversible flux change when subjected to an amplitude-limited drive field of approximately $NI_0/4$;
said element undergoing relatively substantial irreversible flux change when subjected to an amplitude-limited drive field of approximately $NI_0/2$;
first write drive means for coupling a first polarity amplitude-limited first write drive field of approximately $NI_0/4$ to said element;
second write drive means for coupling a first polarity amplitude-limited second write drive field of approximately $NI_0/4$ to said element;
read drive means for coupling a second polarity, opposite to said first polarity, amplitude-limited read drive field of approximately $-NI_0$ to said element;
first saturating drive means for coupling a second polarity first saturating drive field to said element for placing said element in an initial negative substantially-saturated remanent magnetic stable-state;
readout means for generating therein a readout signal when said element undergoes a flux change due to the application of said read drive field;
said read drive field inducing a relatively insubstantial signal in said readout means when said element has been previously affected by only said first write drive field;
said read drive field inducing a relatively substantial signal in said readout means when said element has been previously concurrently affected by said first and said second write drive fields.

5. A magnetic memory device, comprising:
a magnetizable memory element having a substantially rectangular hysteresis characteristic and being capable of being operated in a time-limited, an amplitude-limited or a saturated condition as a function of a magnetic field of a predetermined amplitude-duration characteristic;
said element having a switching threshold $NI_0$;
said element undergoing substantially no irreversible flux change when subjected to an amplitude-limited drive field of approximately $NI_0/4$;
said element undergoing substantial irreversible flux change when subjected to an amplitude-limited drive field of approximately $NI_0/2$;
first write drive means for coupling a first polarity amplitude-limited first write drive field of approximately $NI_0/4$ to said element;
second write drive means for coupling a first polarity amplitude-limited second write drive field of approximately $NI_0/4$ to said element;
read drive means for coupling a second polarity, opposite to said first polarity, read drive field of approximately $-NI_0$ to said element;
clear drive means for coupling a second polarity amplitude-limited clear drive field to said element for placing said element in an initial clear remanent magnetic stable-state;
readout means for generating therein a readout signal when said element undergoes a flux change due to the application of said read drive field;

said read drive field inducing an insubstantial signal in said readout means when said element has been previously affected by only said first write drive field;

said read drive field inducing a substantial signal in said readout means when said element has been previously concurrently affected by said first and said second write drive fields.

6. A magnetic memory device, comprising:

a magnetizable memory element having a substantially rectangular hysteresis characteristic and being capable of being operated in a time-limited, an amplitude-limited or a saturated condition as a function of a magnetic field of a predetermined amplitude-duration characteristic;

said element having a switching threshold $NI_0$;

said element undergoing substantially no irreversible flux change when subjected to an amplitude-limited drive field of approximately $NI_0/4$;

said element undergoing substantial irreversible flux change when subjected to an amplitude-limited drive field of approximately $NI_0/2$;

first write drive means for coupling a first polarity amplitude-limited first write drive field of approximately $NI_0/4$ to said element;

second write drive means for coupling a first polarity amplitude-limited second write drive field of approximately $NI_0/4$ to said element;

read drive means for coupling a second polarity, opposite to said first polarity, amplitude-limited read drive field of at least $-NI_0$ to said element;

clear drive means for coupling a second polarity amplitude-limited clear drive field of at least $-NI_0$ to said element for placing said element in an initial clear remanent magnetic stable-state;

readout means for generating therein a readout signal when said element undergoes a flux change due to the application of said read drive field;

said read drive field inducing an insubstantial signal in said readout means when said element has been previously affected by only one of said first or second write drive fields;

said read drive field inducing a substantial signal in said readout means when said element has been previously concurrently affected by said first and said second write drive fields.

7. A magnetic memory array, comprising:

a planar array of magnetizable memory devices arranged in X rows and Y columns;

said devices forming multi-bit words of X bits along each column with corresponding bits of each word in the same row;

Y word lines each coupling only all the devices in one column;

X bit lines each coupling only all the devices in one row;

X sense lines each coupling only all the devices in one row;

each of said devices having at least one magnetizable memory element having a substantially rectangular hysteresis characteristic and being capable of being operated in a time-limited, an amplitude-limited or a saturated condition as a function of a magnetic field of a predetermined amplitude-duration characteristic;

each of said elements having a switching threshold $NI_0$;

each of said elements undergoing substantially no irreversible flux change when subjected to an amplitude-limited drive field of approximately $NI_0/4$;

each of said elements undergoing a relatively substantial irreversible flux change when subjected to an amplitude-limited drive field of approximately $NI_0/2$;

first write drive means coupled to said Y word lines for selectively coupling a positive polarity amplitude-limited write drive field of approximately $NI_0/4$ to the devices of the selected Y word line;

second write drive means coupled to said X bit lines for selectively coupling a positive polarity amplitude-limited write drive field of approximately $NI_0/4$ to the devices of the selected X bit lines;

read drive means coupled to said Y word lines for selectively coupling a negative polarity read drive field of at least $-NI_0$ to the devices of the selected Y word line;

first saturating drive means coupled to said Y word lines for coupling a negative polarity drive field to the devices of the Y word lines for placing said elements in an initial negative substantially-saturated remanent magnetic stable-state;

said read drive field causing a substantial readout signal to be induced in said sense lines when the associated devices have been previously affected by concurrent application of said first and second write drive fields;

said read drive field causing an insubstantial readout signal to be induced in said sense lines when the associated devices have been previously affected by the application of only one of said first or second write drive fields.

8. A magnetic memory array, comprising:

a planar array of magnetizable memory devices arranged in X rows and Y columns;

said devices forming multi-bit words of X bits along each column with corresponding bits of each word in the same row;

Y word lines each coupling only all the devices in one column;

X bit lines each coupling only all the devices in one row;

X sense lines each coupling only all the devices in one row;

each of said devices having at least one magnetizable memory element having a substantially rectangular hysteresis characteristic and being capable of being operated in a time-limited, an amplitude-limited or a saturated condition as a function of a magnetic field of a predetermined amplitude-duration characteristic;

each of said elements having a switching threshold $NI_0$;

each of said elements undergoing substantially no irreversible flux change when subjected to an amplitude-limited drive field of approximately $NI_0/4$;

each of said elements undergoing a substantial irreversible flux change when subjected to an amplitude-limited drive field of approximately $NI_0/2$;

first write drive means coupled to said Y word lines for selectively coupling a positive polarity amplitude-limited write drive field of approximately $NI_0/4$ to the elements of the selected Y word line;

second write drive means coupled to said X bit lines for selectively coupling a positive polarity amplitude-limited write drive field of approximately $NI_0/4$ to the elements of the selected X bit lines;

read drive means coupled to said Y word lines for selectively coupling a negative polarity saturating read drive field to the elements of the selected Y word line;

first saturating drive means coupled to said Y word lines for coupling a negative polarity drive field to the elements of the Y word lines for placing said elements in an initial negative substantially-saturated remanent magnetic stable-state;

said read drive field causing a substantial readout signal to be induced in said sense lines when the associated elements have been previously affected by concurrent application of said first and second write drive fields;

said read drive field causing an insubstantial readout signal to be induced in said sense lines when the associated elements have been previously affected by the application of only one of said first or second write drive fields.

9. A magnetic memory array, comprising:

a planar array of magnetizable memory devices arranged in X rows and Y columns;

said devices forming multi-bit words of X bits along each column with corresponding bits of each word in the same row;

each of said devices having at least first and second magnetizable memory elements each having a substantially rectangular hysteresis characteristic and being capable of being operated in a time-limited, an amplitude-limited or a saturated condition as a function of a magnetic field of a predetermined amplitude-duration characteristic;

Y word lines each coupling only all the first and second elements in one column;

X bit lines each coupling only all the first elements in one row;

X sense lines each coupling the first elements in a first magnetic sense and the second elements in a second opposite magnetic sense of all the devices in one row;

each of said elements having a switching threshold $NI_0$;

each of said elements undergoing substantially no irreversible flux change when effected by an amplitude-limited drive field of approximately $NI_0/4$;

each of said elements undergoing a substantial irreversible flux change when subjected to an amplitude-limited drive field of approximately $NI_0/2$;

first write drive means coupled to said Y word lines for selectively coupling a positive polarity amplitude-limited write drive field of approximately $NI_0/4$ to the first and second elements of the devices of the selected Y word line;

second write drive means coupled to said X bit lines for selectively coupling a positive polarity amplitude-limited write drive field of approximately $NI_0/4$ to the first elements of the devices of the selected X bit lines;

read drive means coupled to said Y word lines for selectively coupling a negative polarity read drive field of at least $-NI_0$ to the first and second elements of the devices of the selected Y word line;

first saturating drive means coupled to said Y word lines for coupling a negative polarity drive field to the first and second elements of the devices of the Y word lines for placing said elements in an initial negative substantially-saturated remanent magnetic stable-state;

said read drive field causing a substantial readout signal to be induced in said sense lines when the associated elements have been previously affected by concurrent application of said first and second write drive fields;

said read drive field causing an insubstantial readout signal to be induced in said sense lines when the associated elements have been previously affected by the application of only one of said first or second write drive fields.

References Cited

UNITED STATES PATENTS

| | | | |
|---|---|---|---|
| 2,856,596 | 10/1958 | Miller | 340—174 |
| 2,862,198 | 11/1958 | Stuart-Williams et al. | 340—174 |
| 3,027,547 | 3/1962 | Froehlich | 340—174 |
| 3,032,749 | 5/1962 | Newhouse | 340—174 |
| 3,196,413 | 7/1965 | Teig | 340—174 |
| 3,274,570 | 9/1966 | Brekne | 340—174 |
| 3,278,916 | 10/1966 | Kiseda et al. | 340—174 |

BERNARD KONICK, *Primary Examiner.*

S. M. URYNOWICZ, *Assistant Examiner.*